(12) United States Patent
Hung et al.

(10) Patent No.: US 7,545,467 B2
(45) Date of Patent: Jun. 9, 2009

(54) TRANSFLECTIVE LIQUID CRYSTAL DISPLAYS AND METHODS FOR FABRICATING THE SAME

(75) Inventors: Kuo-Yung Hung, Miaoli (TW); Chih-Ming Chang, Taoyuan (TW); Chih-Jen Hu, Hsinchu (TW); Chih-Chun Pei, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 224 days.

(21) Appl. No.: 11/554,657

(22) Filed: Oct. 31, 2006

(65) Prior Publication Data
US 2007/0247572 A1  Oct. 25, 2007

(30) Foreign Application Priority Data
Apr. 21, 2006  (TW)  .............................. 95114273 A (51) Int. Cl.
G02F 1/1335  (2006.01)
(52) U.S. Cl. .................. 349/114; 349/106; 349/107; 349/113
(58) Field of Classification Search ................ 349/106, 349/107, 108, 113, 114, 115, 129, 130, 138, 349/139, 141, 143, 144, 146, 151, 155, 156, 349/159, 187, 33, 38, 41, 56, 61, 68, 69, 349/73, 96
See application file for complete search history.

(56) References Cited

U.S. PATENT DOCUMENTS

| | | | |
|---|---|---|---|
| 6,476,889 B2 | 11/2002 | Urabe | |
| 6,888,604 B2 * | 5/2005 | Rho et al. | 349/146 |
| 6,989,876 B2 | 1/2006 | Song | |
| 2004/0095521 A1 * | 5/2004 | Song et al. | 349/61 |
| 2004/0169807 A1 * | 9/2004 | Rho et al. | 349/139 |
| 2004/0263748 A1 * | 12/2004 | Park et al. | 349/141 |
| 2005/0068477 A1 * | 3/2005 | Shin et al. | 349/106 |
| 2005/0140906 A1 * | 6/2005 | Baek | 349/144 |
| 2005/0140907 A1 * | 6/2005 | Yun | 349/144 |
| 2005/0162600 A1 | 7/2005 | Rho | |
| 2005/0168673 A1 * | 8/2005 | Chuang et al. | 349/114 |
| 2005/0206815 A1 * | 9/2005 | Jeong | 349/114 |
| 2007/0091043 A1 | 4/2007 | Rho | |

FOREIGN PATENT DOCUMENTS

| | | |
|---|---|---|
| CN | 1484071 | 3/2004 |
| JP | 2001166289 | 6/2001 |

OTHER PUBLICATIONS

China Office Action mailed Jun. 29, 2007.

* cited by examiner

Primary Examiner—Ellen Kim
(74) Attorney, Agent, or Firm—Thomas, Kayden, Horstemeyer & Risley (57) ABSTRACT

A transflective liquid crystal display. A first substrate comprises a plurality of pixels, each pixel comprises a plurality of sub-pixels and each sub-pixel comprises at least one transmissive and at least one reflective regions. A second substrate is opposite to the first substrate, divided into a plurality of regions corresponding to the sub-pixels, and at least three of the regions are color regions and at least one of the regions is a fourth region. A first covering layer covers the first substrate, wherein the first covering layer in the transmissive region corresponding to the fourth region is substantially thicker than that corresponding to the three color regions, and the first covering layer in the reflective region corresponding to the fourth region has a thickness substantially equal to that corresponding to the three color regions. A liquid crystal layer is disposed between the first and second substrates.

12 Claims, 9 Drawing Sheets

FIG. 8

TRANSFLECTIVE LIQUID CRYSTAL DISPLAYS AND METHODS FOR FABRICATING THE SAME

BACKGROUND OF THE INVENTION

1. Field of the Invention

The present invention relates to a display and methods for fabricating the same, and more particularly, to a liquid crystal display and methods for fabricating the same.

2. Description of the Related Art

Liquid crystal displays (LCD) are commonly used for flat panel displays. Owing to dielectric anisotropy and conductive anisotropy of liquid crystal molecules, molecular orientation of liquid crystals can be shifted under an external electronic field, such that various optical effects are produced. The panel structure of an LCD typically comprises two laminated substrates separated by a gap and liquid crystal injected therebetween. Corresponding electrodes on each substrate control the direction and arrangement of liquid crystal molecules.

Figure 1A:
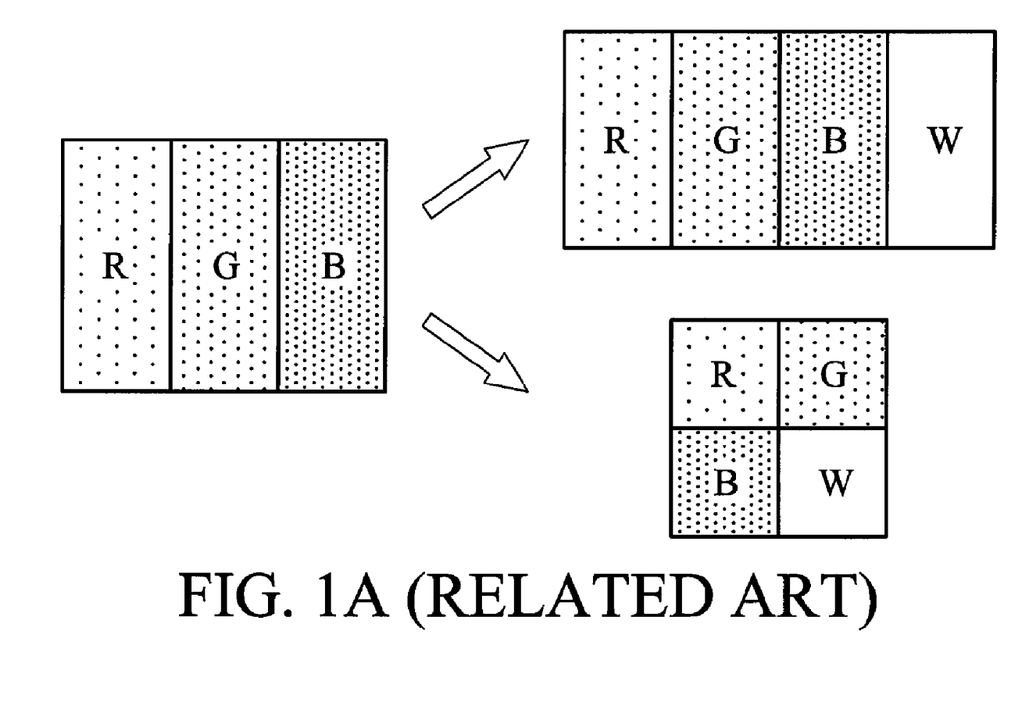
FIG. 1A is schematic view of pixel arrangement of a mixed RGBW LCD.

Referring to FIG. 1A, in addition to the three primary colors pixels, which are red, green, and blue pixels, a white pixel is also provided to increase transmissive or reflective brightness and thus reduce power consumption. Mixed RGBW LCDs, however, suffer from many drawbacks.

Figure 1B:
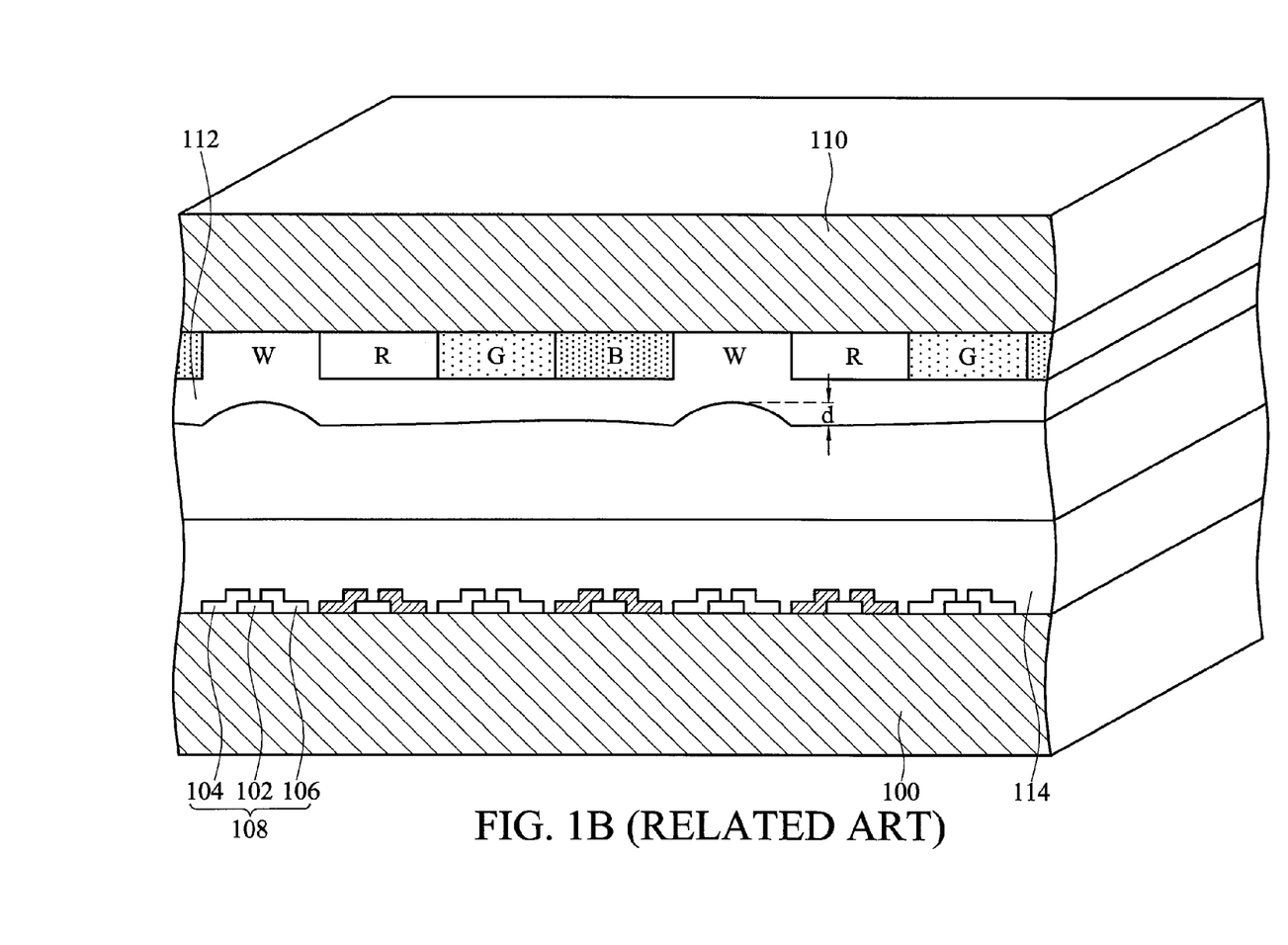
FIG. 1B is cross section of a conventional transflective liquid crystal display.

Referring to FIG. 1B, a first substrate 100 such as an array substrate is provided. The first substrate 100 comprises a plurality of pixels, each comprising a plurality of sub-pixels. A plurality of thin film transistors (TFTs) 108 is then formed on the first substrate 100, and each sub-pixel corresponds to a TFT 108. The TFT 108 comprises a gate 102, source 104, and drain 106.

A second substrate 110 opposite to the first substrate 100 is provided. The second substrate 210, preferably is a color filter substrate, comprises a red region provided with a red resist layer R thereon, a blue region provided with a blue resist layer B thereon, a green region provided with a green resist layer G thereon and a white region provided with a transparent resist layer W thereon, wherein each region corresponds to a sub-pixel. Thus, a color filter layer with the mixed RGBW is obtained.

After forming the RGB resist layers, a planarized covering layer 112 is blanketly coated on the second substrate 110 and the gaps between RGB resist layers is thus filled with the covering layer 212, thereby forming the transparent resist layer W. The planarized covering layer 112 is beneficial for subsequent fabrication processes due to its planar surface. Because the RGB resist layers affect surface tension and mechanical action of the covering layer 112, a gap "d" exists in portions of the covering layer 112 corresponding to the white region. Accordingly, a color shift phenomenon such as a yellow shift arises in LCDs.

BRIEF SUMMARY OF THE INVENTION

In accordance with one embodiment of the present invention, a transflective liquid crystal display comprises a first substrate comprising a plurality of pixels, wherein each pixel comprises a plurality of sub-pixels and each sub-pixel comprises at least one transmissive region and at least one reflective region. A second substrate is substantially opposite to the first substrate, wherein the second substrate is defined into a plurality of regions corresponding to the sub-pixels, and at least three of the regions are color regions and at least one of the regions is a fourth region. A first covering layer covers the first substrate, wherein a portion of the first covering layer in the transmissive region of each sub-pixels corresponding to the at least one fourth region is substantially thicker than other portions of the first covering layer in the transmissive region of each sub-pixels corresponding to the at least three of the regions, and the thickness of the first covering layer in the reflective region of each sub-pixels corresponding to the at least one fourth region is substantially equal to the thickness of other portions of the first covering layer in the reflective region of each sub-pixels corresponding to the at least three of the regions. And a liquid crystal layer is disposed between the first substrate and the second substrate.

In accordance with another embodiment of the present invention, a method for forming a transflective liquid crystal display comprises providing a first substrate comprising a plurality of pixels, each pixel comprises a plurality of sub-pixels, and each sub-pixel comprises at least one transmissive region and at least one reflective region. A second substrate substantially opposite to the first substrate is provided, wherein the second substrate are defined into a plurality of regions corresponding to the sub-pixels, and at least three of the regions are color regions and at least one of the regions is a fourth region. A first covering layer is formed on the first substrate. A plurality of lithography processes are performed on the first covering layer, wherein number of exposures of the first covering layer in the transmissive region of each sub-pixels corresponding to the at least one fourth region are less substantially than that of the first covering layer in the transmissive region of each sub-pixels corresponding to the at least three of the regions, and a liquid crystal layer is interposed between the first substrate and the second substrate.

In accordance with yet another embodiment of the present invention, a method for fabricating a display comprises providing a first substrate comprising a plurality of pixels, each pixel comprises a plurality of sub pixels. A second substrate substantially opposite to the first substrate is provided, wherein the second substrate is defined into a plurality of regions corresponding to the sub-pixels, and at least three of the regions are color regions and at least one of the regions is a fourth region. A photoresist pattern layer is formed on the second substrate, wherein the photoresist pattern layer corresponding to the at least three color regions are color resist layers and the photoresist pattern layer corresponding to the at least one fourth region is a fourth resist layer. A first covering layer is formed on the photoresist pattern layer. And a liquid crystal layer is interposed between the first substrate and the second substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the present invention and should not be taken in a limiting sense. The scope of the present invention is best determined by reference to the appended claims.

In this specification, expressions such as "overlying the substrate", "above the layer", or "on the film" simply denote a relative positional relationship with respect to the surface of the base layer, regardless of the existence of intermediate layers. Accordingly, these expressions may indicate not only the direct contact of layers, but also, a non-contact state of one or more laminated layers.

Figure 2:
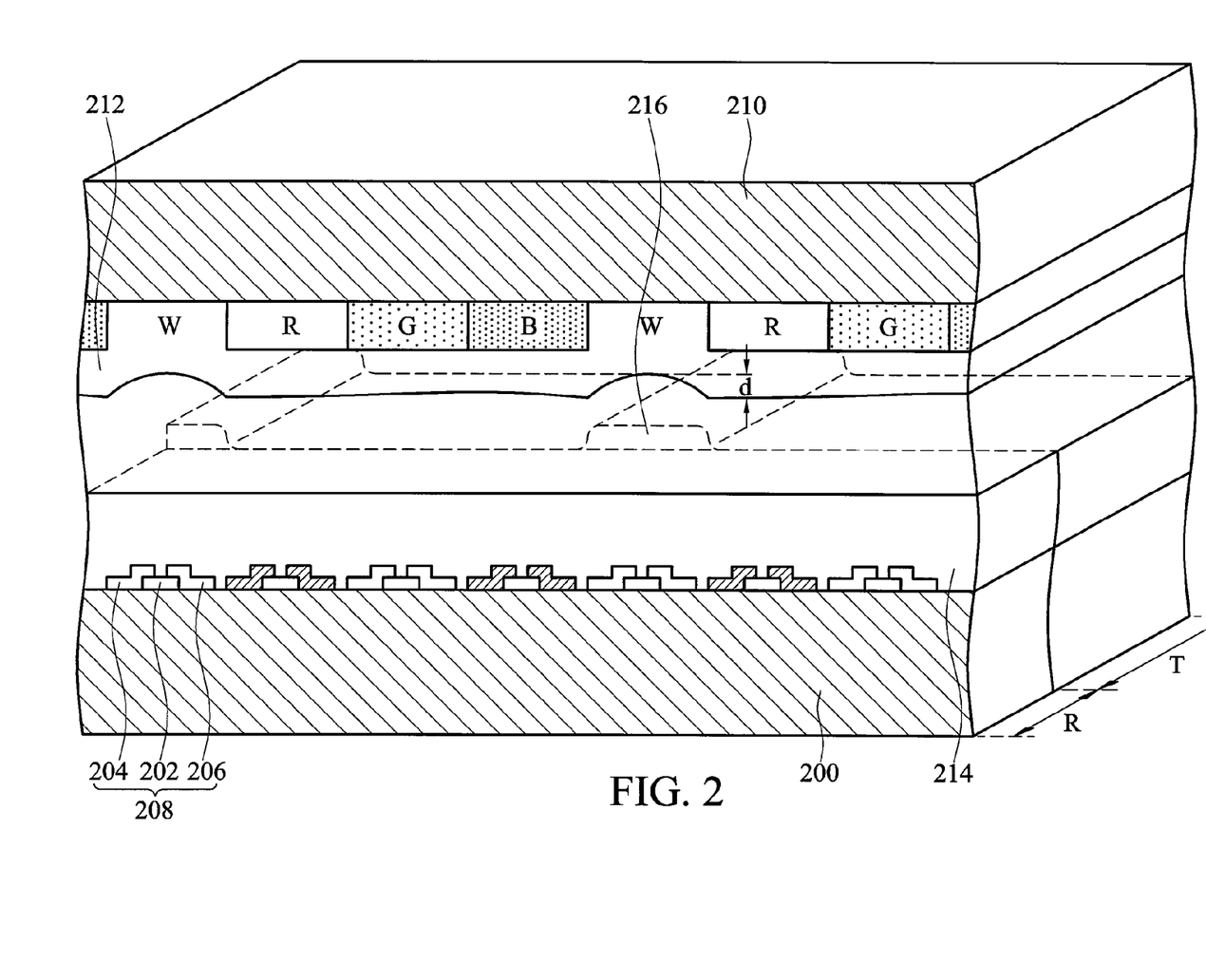
FIG. 2 is a cross section of an embodiment of a single gap transflective liquid crystal display of the present invention.

FIG. 2 shows a cross section of a single gap transflective liquid crystal display according with a preferred embodiment of the present invention. Referring to FIG. 2, a first substrate 200, which the materials may comprise transparent material such as glass, low alkali glass, non-alkali glass, or likes, flexible material such as plastics, poly carbonate (PC), polymethyl methacrylate (PMMA), or likes, opaque material such as ceramics, wafer, or likes, is provided. The first substrate 200 comprises a plurality of pixels for displaying image, each comprising a plurality of sub-pixels. Each sub-pixel comprises at least a reflective region R and at least a transmissive region T. In the reflective region R, a light source for the liquid crystal display is provided by reflected exterior light, while in the transmissive region T, a back light source is used as a light source for the liquid crystal display. The transflective liquid crystal display thus reduces power consumption and achieves better efficiency.

A plurality of thin film transistors (TFTs) 208 are formed on the first substrate 200 which may be an array substrate. In a preferred embodiment, each sub-pixel corresponds to a TFT 208, and each TFT 208 comprises a gate 202, a channel (not shown), an ohmic contact layer (not shown), source 204, and drain 206. Preferably, the TFT 208 may be a bottom-gate type TFT, but not-limited it's. Of course, other types of TFTs such as a top-gate type TFT, an etching stop type TFT, or likes may be can to use. Constructing of the material of the TFT 208 may comprise polysilicon, amorphous silicon, single crystal silicon, microcrystalline silicon, or combinations thereof. In other words, the material of the channel (not shown) and the ohmic contact layer (not shown) may comprise polysilicon, amorphous silicon, single crystal silicon, microcrystalline silicon, or combinations thereof. The ohmic contact layer (not shown) may be doped with N type ions such as P, As, or the like. Alternatively, the ohmic contact layer (not shown) may be doped with P type ions such as B or the like.

A second substrate 210 substantially opposite to the first substrate 200 is provided. The second substrate 210, preferably a color filter substrate, may comprise at least three color regions and at least one fourth region corresponding to the sub-pixels. These three color regions may comprise a red region provided with a red resist layer R thereon, a blue region provided with a blue resist layer B thereon and a green region provided with a green resist layer G thereon. The fourth region may comprise a white region, also referred to as an achromatic region, provided with a transparent resist layer W thereon. A color filter layer with the mixed RGBW is thus obtained.

The embodiments of the present invention described hereinafter are based on the three primary colors RGB as shown in FIG. 2. The present invention is, however, not limited to the disclosed RGB regions. In other words, various colors of resist layers in the color regions, for example, yellow, brown, purple, or other colors can be used without departing from the spirit or scope of the present inventive concept. Additionally, the embodiments of the present invention are based on a rectangular shape of the color regions and the fourth region. The present invention is, however, not limited to the rectangular color regions or the fourth region disclosed. Various shapes of the color regions and the fourth region can be used, for example, circle, polygon, triangle, hexagon, or ellipse without departing from the spirit or scope of the present inventive concept. Furthermore, the present invention is not limited to the white region in the fourth region. Other colors of the resist layer or the colors of the resist layer can be used in the fourth region for improving color saturation and color contrast of an LCD.

In the above-mentioned LCD structure, a flatness of a covering layer 212 is blanketly coated on the second substrate 210 after forming the RGB resist layers, and the gaps between RGB resist layers is thus filled with the covering layer 212, thereby forming the transparent resist layer W. The covering layer 212 is beneficial to subsequent fabrication processes due to its planar surface. Because the RGB resist layers affect surface tension and mechanical action of the covering layer 212, a gap "d" exists in portions of the covering layer 212 corresponding to the fourth region.

In a preferred embodiment, a covering layer 214 is formed on the first substrate 200 to cover the first substrate 200 and the TFTs 208. In the transmissive region T, a portion of the covering layer 214 corresponding to the fourth region (white region) is substantially thicker than other portions of the covering layer 214 corresponding to the color regions. In the reflective region R, a portion of the covering layer 214 corresponding to the fourth region (white region) and the color regions has substantially uniform thickness. In other words, the covering layer 214 corresponding to the transmissive region T of the fourth region has a protruding portion 216. The protruding portion 216 of the covering layer 214 compensates for the gap "d" in the covering layer 212 corresponding to the white region, and optical efficiency of a display is thus improved.

Detailed description of forming the aforementioned structure of the covering layer 214 is provided in the following. The covering layer 214, preferably comprising photo-sensitive material, is formed on the first substrate 200. The covering layer 214 is exposed for a plurality of times, wherein the number of exposures of the covering layer 214 corresponding to the white region in the transmissive region T is less than that of the covering layer 214 corresponding to the red, blue, and green regions in the transmissive region T. The covering layer 214 is then developed.

Figure 4A:
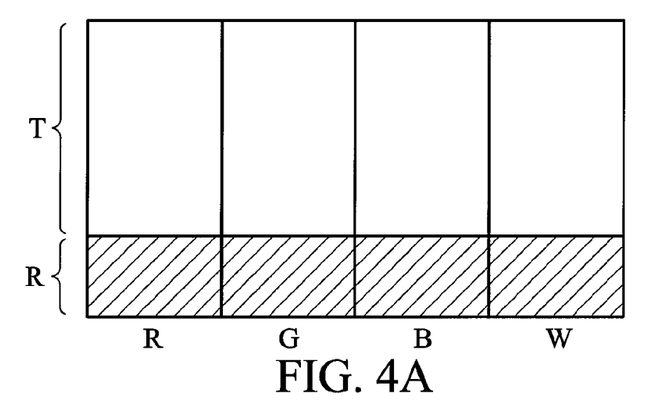
FIG. 4A-4C are schematic views showing formation of the second covering layer of the single gap transflective liquid crystal display according with a preferred embodiment of the present invention.

FIG. 4A-4B are schematic views showing formation of the covering layer 214 of the single gap transflective liquid crystal display according with a preferred embodiment of the present invention. Referring to FIG. 4A, the covering layer 214, which may comprise photo-sensitive material such as photoresist, is blanketly coated on the first substrate (not shown) to cover the thin film transistors (not shown) and the first substrate. In a preferred embodiment, the photoresist layer acting as the covering layer is a positive photoresist layer. The covering layer 214 corresponding to the reflective region T is exposed, while the covering layer 214 corresponding to the transmissive region T is shaded by a mask such as a photomask. The exposed portion of the covering layer 214 is marked by oblique lines.

Figure 4B:
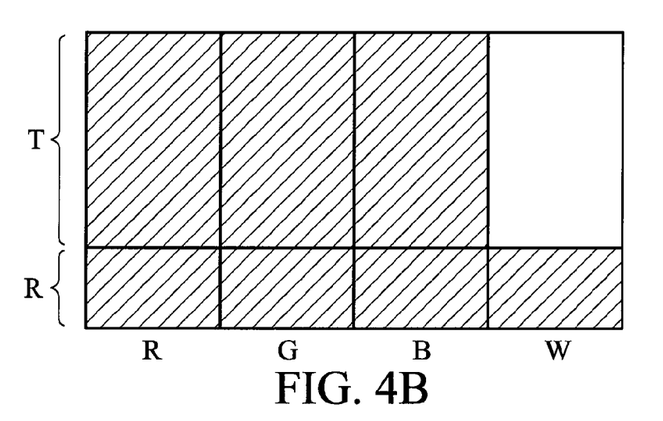
Figure 4C:
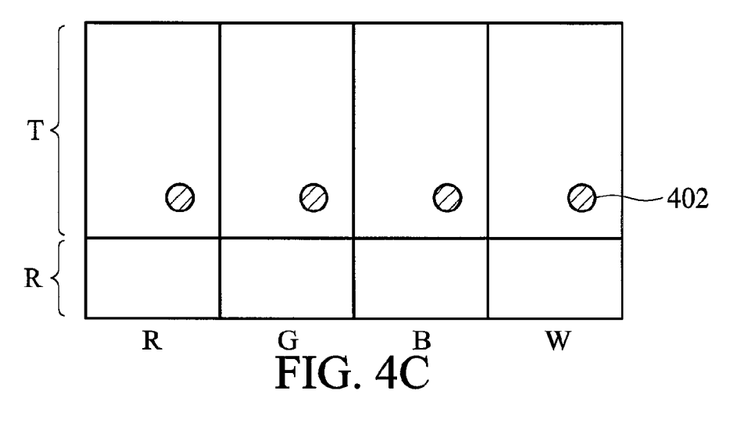

Referring to FIG. 4B, the covering layer 214 corresponding to the transmissive region T of the fourth region (white region) is shaded by, for example, a photomask, while the covering layer 214 corresponding to the transmissive region T of the RGB regions and the covering layer 214 corresponding to the reflective region R are exposed. Referring to 4C, the covering layer 214 besides openings 402 in the transmissive region T is shaded by, for example, a photomask, while the covering layer 214 corresponding to the opening segments in the transmissive region T is exposed. In the light of the previously described method for performing lithography processes on the covering layer 214, the number of exposures of the covering layer 214 in the transmissive region of each sub-pixels corresponding to the at least one fourth region is less than that of the first covering layer in the transmissive region of each sub-pixels corresponding to the at least three of the regions for once. Accordingly, the covering layer 214 corresponding to the transmissive region of the fourth region is substantially thicker than the covering layer 214 corresponding to the transmissive region T of the RGB regions.

In a preferred embodiment, the covering layer 214 may have a thickness of about 2.0 µm. Exposure doses may expose the covering layer 214, made of positive photoresist, to a depth of about 0.6 µm to about 0.8 µm. The covering layer 214 corresponding to the transmissive region T of the white region may have a thickness of about 1.8 µm to about 2.2 µm. The covering layer 214 corresponding to other portions besides the transmissive region T of the white region may have a thickness of about 1 µm to about 1.6 µm, preferably, 1.2 µm to about 1.6 µm. The protruding portion 216 may has a thickness of about 0.1 µm to about 0.3 µm, that is, the portion of the covering layer 214 in the transmissive region of each sub-pixels corresponding to the at least one fourth region is thicker than the other portions of the covering layer 214 in the transmissive region of each sub-pixels corresponding to the at least three of the regions about 0.1 µm to about 0.3 µm.

Figure 5A:
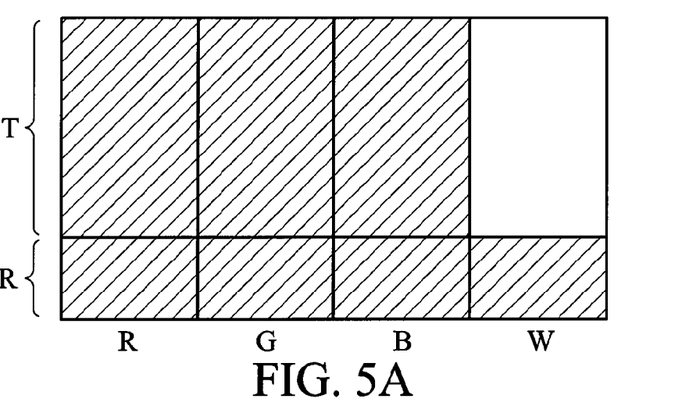
FIGS. 5A-5C are schematic views showing formation of the second covering layer of the single gap transflective liquid crystal display according with another embodiment of the present invention.

FIGS. 5A-5C are schematic views showing formation of the covering layer 214 of the single gap transflective liquid crystal display according with another embodiment of the present invention. Referring to FIG. 5A, the covering layer 214, which may comprise photo-sensitive material such as photoresist, is blanketly coated on the first substrate (not shown) to cover the thin film transistors (not shown) and the first substrate. In a preferred embodiment, the photoresist layer acting as the covering layer 214 is a positive photoresist layer. The covering layer 214 corresponding to the transmissive region T of the fourth region is shaded by, for example, a photomask, while the covering layer 214 corresponding to the transmissive region T of the RGB regions and the covering layer 214 corresponding to the reflective region R are exposed.

Figure 5B:
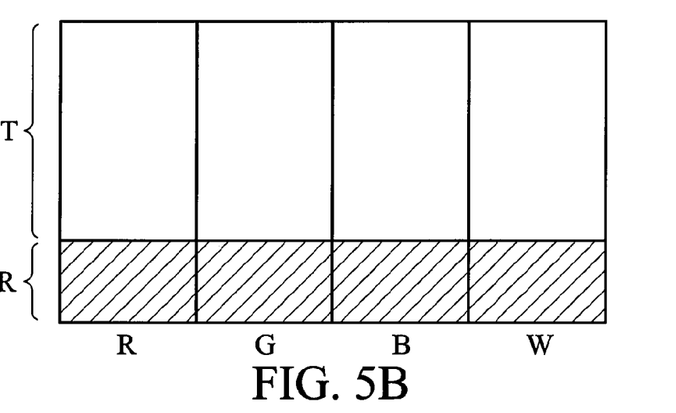
Figure 5C:
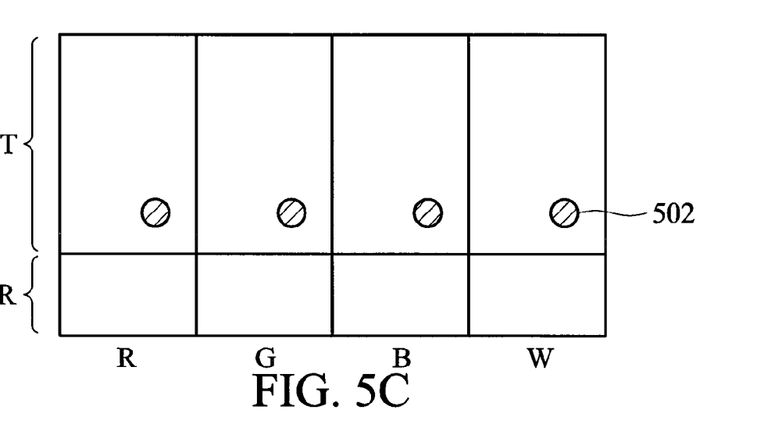

Referring to FIG. 5B, the covering layer 214 corresponding to the transmissive region T is shaded by, for example, a photomask, while the covering layer 214 corresponding to the reflective region R is exposed. Referring to FIG. 5C, the covering layer 214 besides openings 502 in the transmissive region T is shaded by, for example, a photomask, while the covering layer 214 corresponding to the openings 502 in the transmissive region T is exposed. In the light of the previously described method for performing lithography process on the covering layer 214, the number of exposures of the covering layer 214 in the transmissive region of each sub-pixels corresponding to the at least one fourth region is less than that of the covering layer 214 in the transmissive region of each sub-pixels corresponding to the at least three of the regions for once. Accordingly, the covering layer 214 corresponding to the transmissive region of the fourth region is substantially thicker than the covering layer 214 corresponding to the transmissive region T of the RGB regions.

Figure 3:
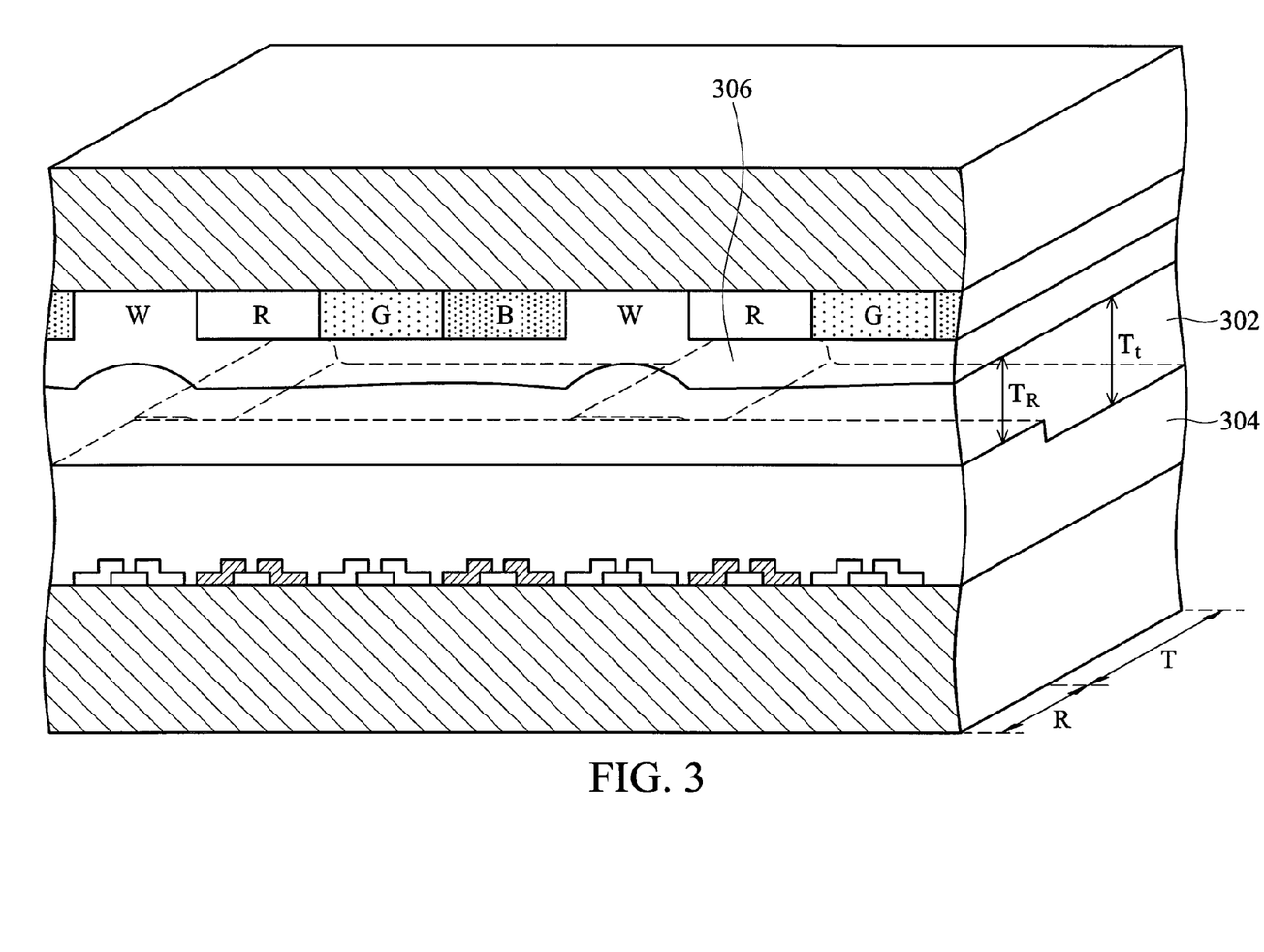
FIG. 3 is a cross section of an embodiment of a dual gap transflective liquid crystal display of the present invention.

FIG. 3 shows a cross section of a dual gap transflective liquid crystal display according with a preferred embodiment of the invention. The structure and fabrication process of FIG. 3 is similar to FIG. 2. Therefore, detailed description thereof is omitted. FIG. 3 differs from FIG. 2 in that a thickness Tr of a liquid crystal layer 302 in a reflective region R is substantially less than a thickness Tt of the liquid crystal layer 302 in a transmissive region T. Accordingly, the covering layer 304 corresponding to the reflective region R is substantially thicker than the covering layer 304 corresponding to the transmissive region T. To reduce the color shift phenomenon, the covering layer 304 corresponding to the fourth region (white region) in the transmissive region T is substantially thicker than the covering layer 304 corresponding to the RGB regions in the transmissive region T. In the reflective region R, a portion of the covering layer 304 corresponding to the fourth region (white region) and the color regions (RGB) has substantially uniform thickness. In a word, the covering layer corresponding to the white region in the transmissive region T has a protruding portion 306.

Detailed description of forming the aforementioned structure of the covering layer 214 is provided in the following. The covering layer 304, preferably comprising photo-sensitive material, is formed on the first substrate. The covering layer 304 is then exposed for a plurality of times, wherein the number of exposures of the covering layer 304 in the transmissive region T is more than that of the covering layer 304 in the reflective region R, and the number of exposures of the covering layer 304 corresponding to the white region in the transmissive region T is less than that of the covering layer 304 corresponding to the RGB regions in the transmissive region T. The covering layer 304 is next developed.

Figure 6A:
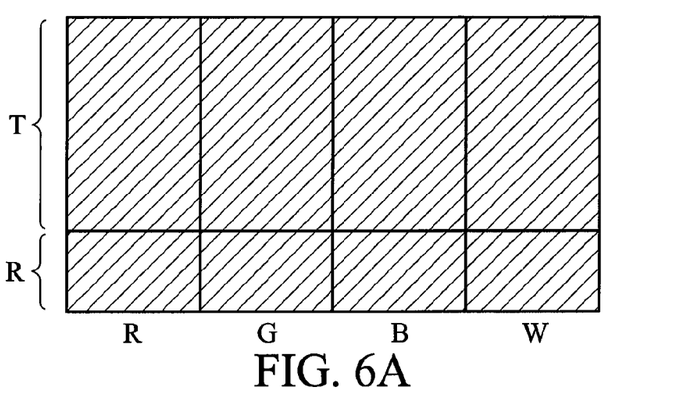
FIGS. 6A-6C are schematic views showing formation of the covering layer of the dual gap transflective liquid crystal display according with a preferred embodiment of the present invention.

FIGS. 6A-6C are schematic views showing formation of the covering layer 304 of the dual gap transflective liquid crystal display according with a preferred embodiment of the invention. Referring to FIG. 6A, the covering layer 304, which may comprise photo-sensitive material such as photoresist, is blanketly coated on the first substrate (not shown) to cover the thin film transistors (not shown) and the first substrate. In a preferred embodiment, the photoresist layer acting as the covering layer 304 is a positive photoresist layer. The entire covering layer 304 is exposed. The exposed portion of the covering layer 304 is marked by oblique lines.

Figure 6B:
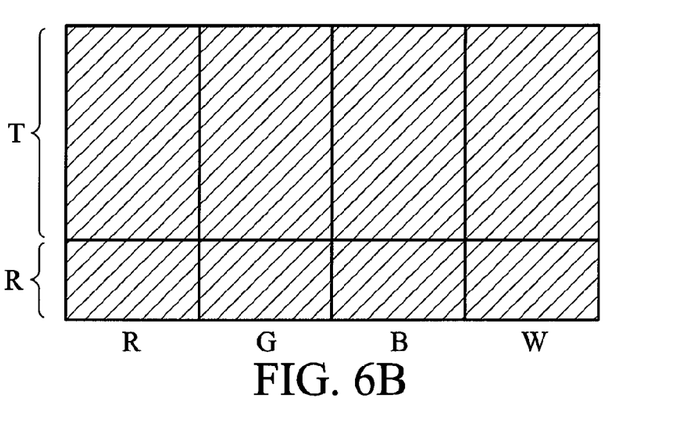
Figure 6C:
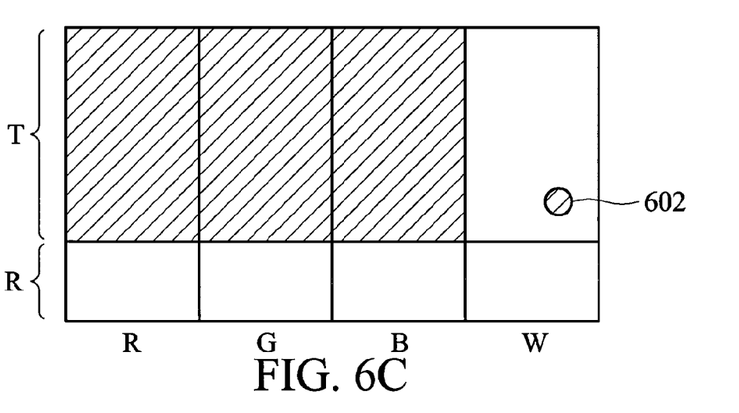

Referring to FIG. 6B, the entire covering layer 304 is then exposed again. Referring to 6C, the covering layer 304 corresponding to the RGB regions in the transmissive region T and the covering layer 304 corresponding to an opening 602 of the white region in the transmissive region T are exposed, while the covering layer 304 except for the opening 602 in the transmissive region T and the covering layer 304 corresponding to the RGB regions and white region in the reflective region R are shaded by, for example, a photomask. In the light of the previously described method for performing lithography processes on the covering layer 304, the number of exposures of the covering layer 304 in the transmissive region of each sub-pixels corresponding to the at least one fourth region (white region) is less than that of the first covering layer in the transmissive region of each sub-pixels corresponding to the at least three of the regions (RGB regions) for once. Accordingly, the covering layer 304 corresponding to the transmissive region of the white region is substantially thicker than the covering layer 304 corresponding to the transmissive region T of the RGB regions.

Figure 7A:
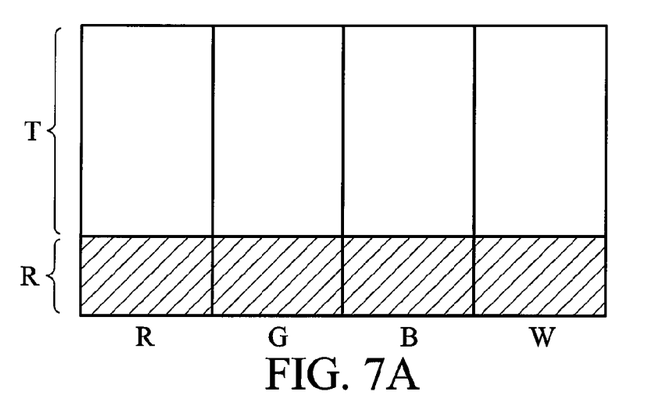
FIGS. 7A-7C are schematic views showing formation of the covering layer of the dual gap transflective liquid crystal display according with another embodiment of the present invention.

FIGS. 7A-7C are schematic views showing formation of the covering layer 304 of the dual gap transflective liquid crystal display according with another embodiment of the invention. Referring to FIG. 6A, the covering layer 304, which may comprise photo-sensitive material such as photoresist, is blankety coated on the first substrate (not shown) to cover the thin film transistors (not shown) and the first substrate. In a preferred embodiment, the photoresist layer acting as the covering layer 304 is a positive photoresist layer. The covering layer 304 in the reflective region R is exposed, while the covering layer 304 in the transmissive region T is shaded by, for example, a photomask.

Figure 7B:
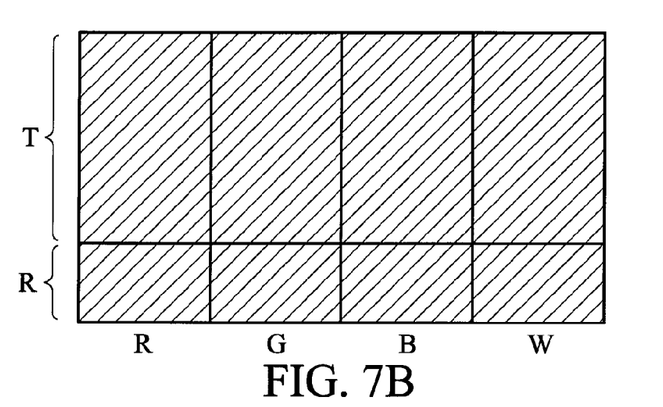
Figure 7C:
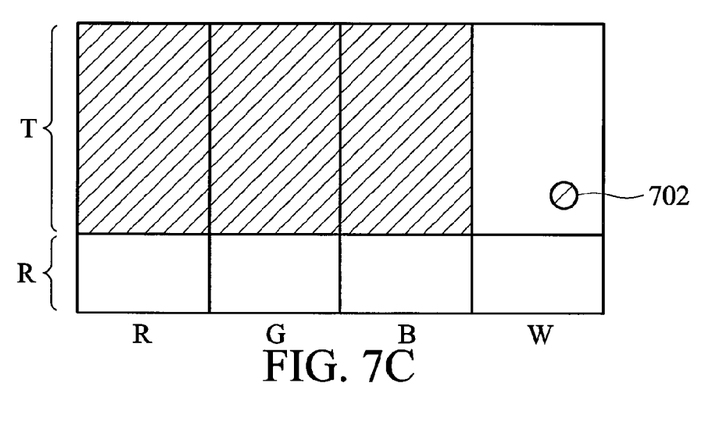

Referring FIG. 7B, the entire covering layer 304 is exposed. Referring to 7C, the covering layer 304 corresponding to the RGB regions in the transmissive region T and the covering layer 304 corresponding to a opening 702 of the white region in the transmissive region T are exposed, while the covering layer 304 except for the opening 702 in the transmissive region T and the covering layer 304 corresponding to the RGB regions and white region in the reflective region R are shaded by, for example, a photomask. In the light of the previously described method for performing lithography process on the covering layer 304, the number of exposures of the covering layer 304 in the transmissive region of each sub-pixels corresponding to the at least one fourth region (white region) is less than that of the first covering layer in the transmissive region of each sub-pixels corresponding to the at least three of the regions (RGB regions) for once. Accordingly, the covering layer 304 corresponding to the transmissive region of the white region is substantially thicker than the covering layer 304 corresponding to the transmissive region T of the RGB regions.

Figure 8:
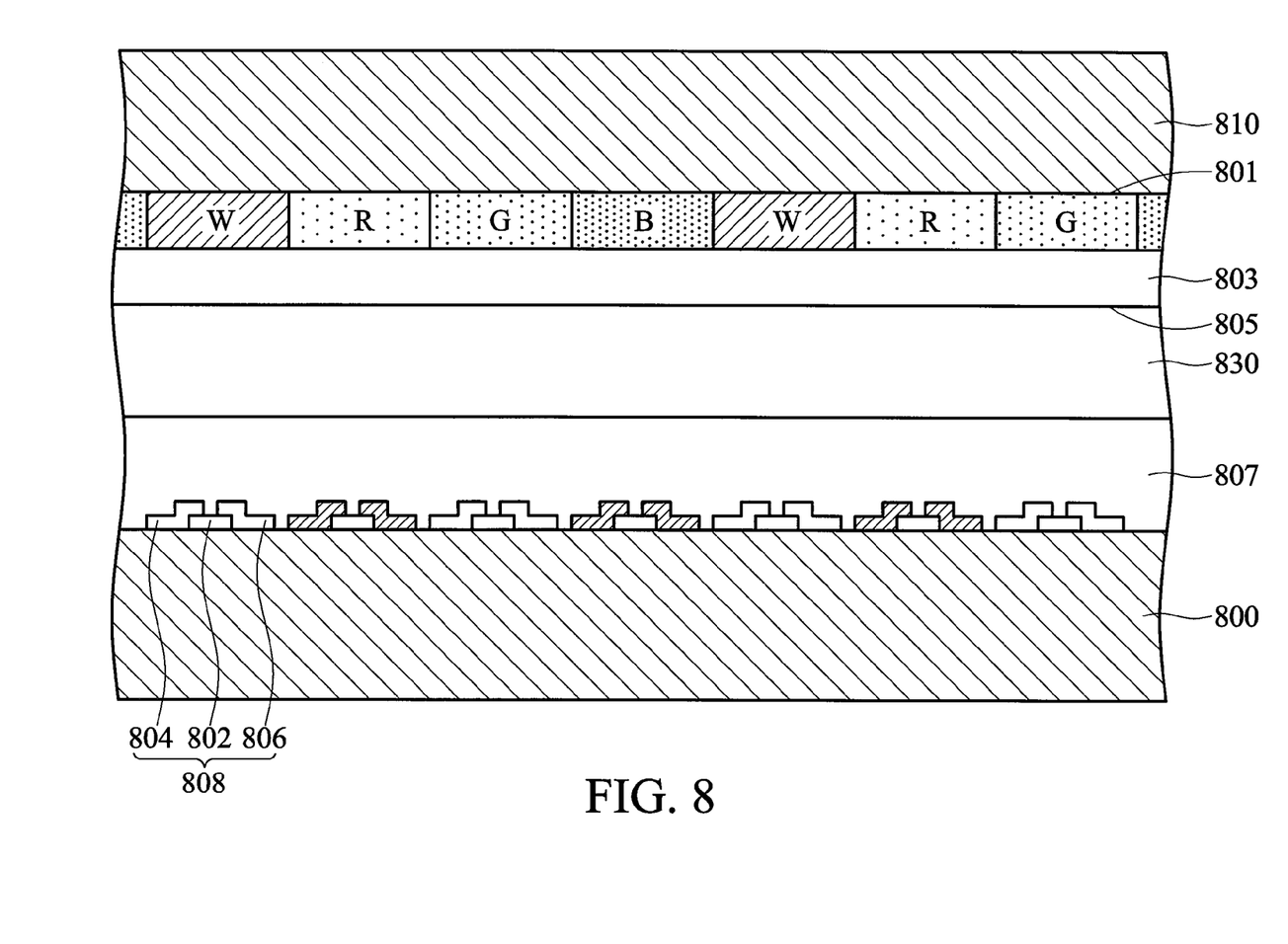
FIG. 8 is a cross section of a transflective liquid crystal display according with another embodiment of the present invention.

FIG. 8 is a cross section of a transflective liquid crystal display according with another embodiment of the invention. Referring to FIG. 8, a first substrate 800, which may comprise transparent material such as glass, low alkali glass, non-alkali glass, or likes, flexible material such as plastics, poly carbonate (PC), polymethyl methacrylate (PMMA), or likes, opaque material such as ceramic, wafer, or likes, is provided. The first substrate 800 comprises a plurality of pixels.

A plurality of thin film transistors (TFTs) 808 are formed on the first substrate 800 which may be an array substrate. In a preferred embodiment, each sub-pixel corresponds to a TFT 808, and each TFT 808 comprises a gate 802, a channel (not shown), an ohmic contact layer (not shown), source 804 and drain 806. Preferably, the TFT 808 may be a bottom-gate type TFT. Alternatively, other types of TFTs such as a top-gate type TFT, an etching stop type TFT, or likes may be used. The TFT 808 may be made of polysilicon, amorphous silicon, single crystal silicon, microcrystalline silicon, or combinations thereof. The channel (not shown) and the ohmic contact layer (not shown) may comprise polysilicon, amorphous silicon, single crystal silicon, microcrystalline silicon, or combinations thereof. The ohmic contact layer (not shown) may be doped with N type ions such as P, As, or likes. Alternatively, the ohmic contact layer (not shown) may be doped with P type ions such as B or likes. A first covering layer 807 is then formed on the first substrate 800 and TFTs 808.

A second substrate 810 opposite to the first substrate 800 is provided. The second substrate 810, preferably a color filter substrate, may comprise at least three color regions and one fourth region corresponding to the sub-pixels. These three color regions may comprise a red region, a blue region, and a green region, and the fourth region may comprise a white region. Photoresist pattern layers are then formed on the second substrate 810. The photoresist pattern layers comprises a red resist layer R in the red region, a blue resist pattern layer B in the blue region, a green resist pattern layer G in the green and a transparent resist pattern layer W in the white region. In a preferred embodiment, the red resist pattern layer R is formed in the red region in the second substrate 810 by a lithography process. The blue resist pattern layer B is formed in the blue region in the second substrate 810 by a lithography process. The green resist pattern layer G is formed in the green region in the second substrate 810 by using a lithography process. The transparent resist pattern layer W is formed in the white region in the second substrate 810 by using a lithography process.

Note that the transparent resist pattern layer W is filled into the fourth region in the second substrate 810, and the transparent W in the color regions such as RGB regions is removed by a lithography process. Because the transparent resist pattern layer W only exists in the white region, a gap "d°" in portions of the covering layer on the second substrate 810 corresponding to the white region due to the surface tension and the mechanical action of the RGB region thus disappears.

A covering layer 803 is then formed in the RGB regions and white region on the second substrate 810. Surface of the covering layer 803 is flat, and there is no gap "d" in the covering layer 803. Lastly, a liquid crystal layer 830 is interposed between the first substrate 800 and the second substrate 810 to complete the fabrication of an LCD.

According to the disclosed embodiments above, in a single gap transflective liquid crystal display or a dual gap transflective liquid crystal display, the covering layer corresponding to the white region is substantially thicker than the covering layer corresponding to the color regions by adjusting the number of exposures of the covering layer in the transmissive region. While, the covering layer corresponding to the reflective region substantially has a uniform thickness. In the reflective region, a circuit controller such as a Look-Up-Table may be used to reduce the color shift phenomenon, for example yellow shift.

Accordingly, embodiments of the present invention provide methods for fabricating a liquid crystal display, which improve optical efficiency of an LCD by eliminating the gap causing the color shift phenomenon in the white region.

While the present invention has been described by way of example and in terms of the preferred embodiments, it is to be understood that the present invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective liquid crystal display, comprising:
   a first substrate comprising a plurality of pixels, each pixel comprises a plurality of sub-pixels, wherein each sub-pixel comprises at least one transmissive region and at least one reflective region;

a second substrate substantially opposite to the first substrate, wherein the second substrate is divided into a plurality of regions corresponding to the sub-pixels, and at least three of the regions are color regions and at least one of the regions is a fourth region;

a first covering layer covering the first substrate, wherein a portion of the first covering layer in the transmissive region of each sub-pixels corresponding to the at least one fourth region is substantially thicker than other portions of the first covering layer in the transmissive region of each sub-pixels corresponding to the at least three of the regions, and the thickness of the first covering layer in the reflective region of each sub-pixels corresponding to the at least one fourth region is substantially equal to the thickness of other portions of the first covering layer in the reflective region of each sub-pixels corresponding to the at least three of the regions; and a liquid crystal layer disposed between the first substrate and the second substrate.

2. The transflective liquid crystal display of claim 1, wherein the portion of the first covering layer in the transmissive region of each sub-pixels corresponding to the at least one fourth region is thicker than the other portions of the first covering layer in the transmissive region of each sub-pixels corresponding to the at least three of the regions about 0.1 µm to about 0.3 µm.

3. The transflective liquid crystal display of claim 1, wherein the first covering layer comprises photo-sensitive material.

4. The transflective liquid crystal display of claim 1, further comprising:

a second covering layer covering the second substrate, wherein the second covering layer in the fourth region is substantially thinner than the second covering layer in the color regions.

5. A method for forming a transflective liquid crystal display, comprising:

providing a first substrate comprising a plurality of pixels, each pixel comprises a plurality of sub-pixels and each sub-pixel comprises at least one transmissive region and at least one reflective region;

providing a second substrate substantially opposite to the first substrate, wherein the second substrate are divided into a plurality of regions corresponding to the sub-pixels, and at least three of the regions are color regions and at least one of the regions is a fourth region;

forming a first covering layer on the first substrate;

performing a plurality of lithographies on the first covering layer, wherein the number of exposures of the first covering layer in the transmissive region of each sub-pixels corresponding to the at least one fourth region are less than that of the first covering layer in the transmissive region of each sub-pixels corresponding to the at least three of the regions; and interposing a liquid crystal layer between the first substrate and the second substrate.

6. The method of claim 5, wherein the first covering layer comprises photo-sensitive material.

7. The method of claim 5, wherein the number of exposures of the first covering layer in the transmissive region of each sub-pixels corresponding to the at least one fourth region is less than that of the first covering layer in the transmissive region of each sub-pixels corresponding to the at least three of the color regions for once.

8. The method of claim 5, wherein performing the lithographies on the first covering layer comprises:

exposing the first covering layer in the reflective region of each pixels corresponding to the at least three color regions and the at least one fourth region;

exposing the first covering layer in the transmissive region of each pixels corresponding to the at least three color regions and the first covering layer in the reflective region of each pixels corresponding to the least three color regions and the at least one fourth region without exposing the first covering layer in the transmissive region of each pixels corresponding to the at least one fourth region;

exposing the portion of the first covering layer in the transmissive region of each pixels corresponding to the at least three color regions and the at least one fourth region to form at least one opening segment; and developing the first covering layer.

9. The method of claim 5, wherein performing the lithographies on the first covering layer comprises:

exposing the first covering layer in the transmissive region of each pixels corresponding to the at least three color regions and the first covering layer the reflective region of each pixels corresponding to at least three the color regions and the at least one fourth region without exposing the first covering layer in the transmissive region of each pixels corresponding to the at least one fourth region;

exposing the first covering layer in the reflective region of each pixels corresponding to the at least three color regions and the at least one fourth region;

exposing the portion of the first covering layer in the transmissive region of each pixels corresponding to the at least three color regions and the at least one fourth region to form at least one opening segment; and developing the first covering layer.

10. The method of claim 5, wherein performing the lithographies on the first covering layer comprises:

exposing the first covering layer in the transmissive region and the reflective region of each pixels corresponding to the at least three color regions and the first covering layer in the transmissive region and the reflective region of each pixels corresponding to the at least one fourth region;

exposing the first covering layer in the transmissive region and the reflective region of each pixels corresponding to the at least three color regions and the first covering layer in the transmissive region and the reflective region of each pixels corresponding to the at least one fourth region again;

exposing the portion of the first covering layer in the transmissive region of each pixels corresponding to the at least three color regions and the at least one fourth region to form at least one opening segment; and developing the first covering layer.

11. The method for forming a transflective liquid crystal display of claim 5, wherein performing the lithographies on the first covering layer comprises:

exposing the first covering layer in the reflective region of each pixels corresponding to the at least three color regions and the at least one fourth region;

exposing the first covering layer in the reflective region and the transmissive region of each pixels corresponding to the at least three color regions and the first covering layer in the reflective region and the transmissive region of each pixels corresponding to the fourth region;

exposing the portion of the first covering layer in transmissive region of each pixels corresponding to the at least three color regions and the at least one fourth region to form at least one opening segment; and developing the first covering layer.

12. The method of claim 5, further comprising:

forming a second covering layer on the second substrate, such that the second covering layer corresponding to the fourth region is substantially thinner than the second covering layer corresponding to the at least three color regions.

* * * * *